Feb. 16, 1954     A. F. FOOTE     2,669,241
VEGETABLE WASHING DEVICE

Filed Nov. 22, 1949     5 Sheets-Sheet 1

INVENTOR.
ALFRED F. FOOTE
BY
Oberlin & Limbach
ATTORNEYS

Feb. 16, 1954 A. F. FOOTE 2,669,241
VEGETABLE WASHING DEVICE
Filed Nov. 22, 1949 5 Sheets-Sheet 2

INVENTOR.
ALFRED F. FOOTE
BY
Oberlin & Limbach
ATTORNEYS.

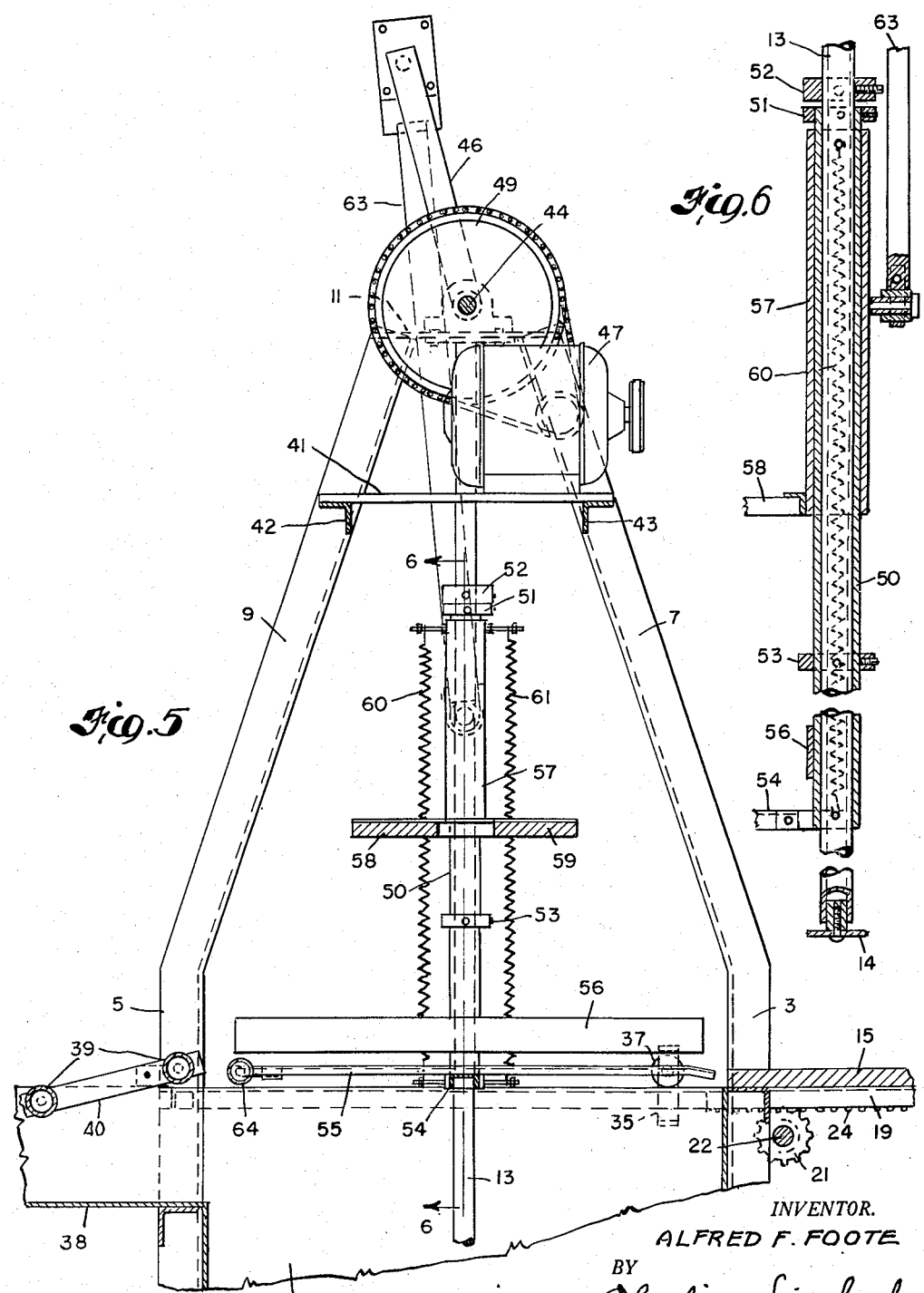

Feb. 16, 1954  A. F. FOOTE  2,669,241
VEGETABLE WASHING DEVICE
Filed Nov. 22, 1949  5 Sheets-Sheet 5
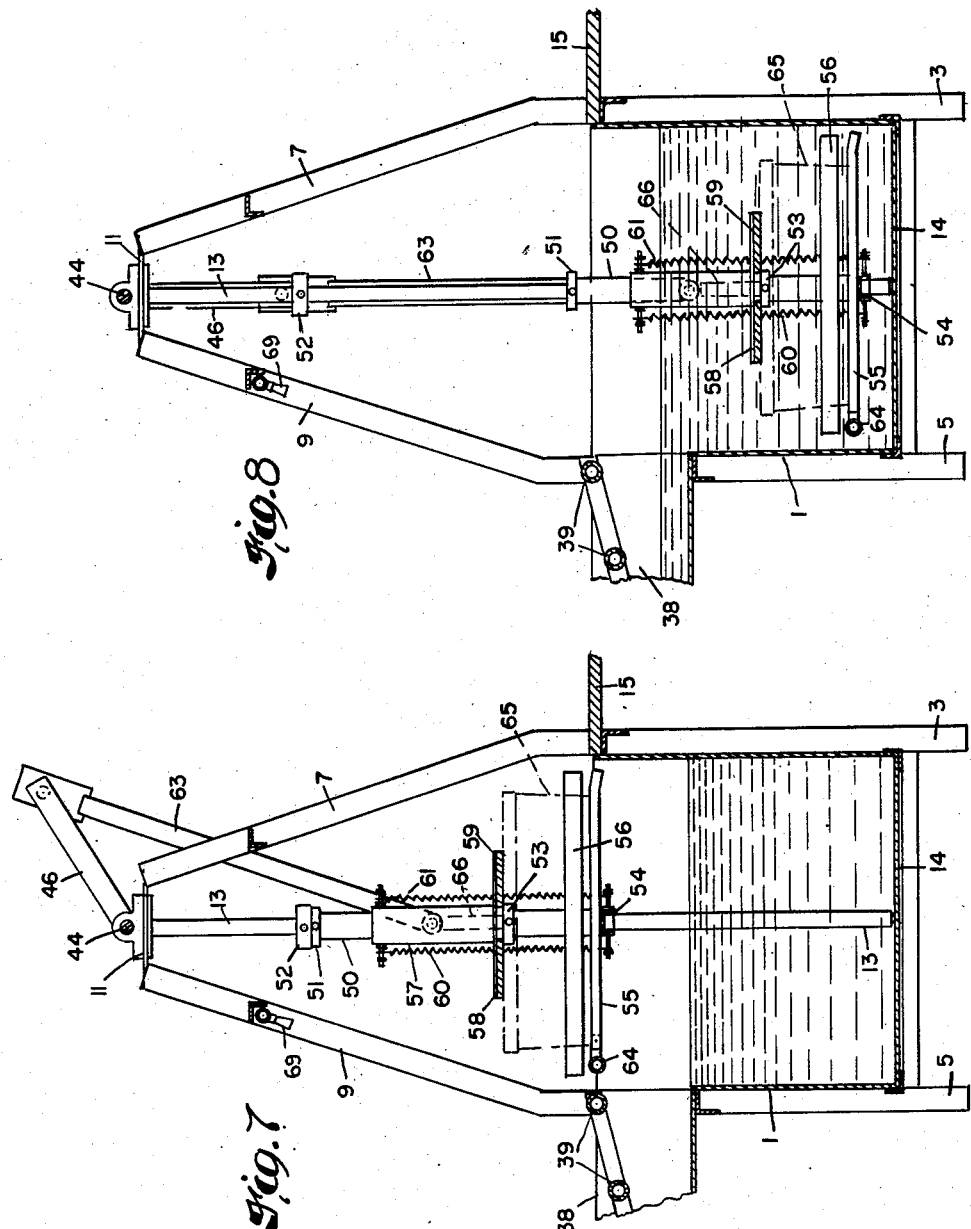
INVENTOR.
ALFRED F. FOOTE
BY
Oberlin + Limbach
ATTORNEYS.

Patented Feb. 16, 1954

2,669,241

UNITED STATES PATENT OFFICE 2,669,241

VEGETABLE WASHING DEVICE

Alfred F. Foote, Independence, Ohio

Application November 22, 1949, Serial No. 128,773

12 Claims. (Cl. 134—133)

This invention relates as indicated to a novel washing device and, more particularly to apparatus especially adapted to the washing of baskets or other containers of vegetables and the like.

While the planting, cultivation, and harvesting of certain types of farm products such as the grains, for example, has now become highly mechanized so as to require a minimum of labor, nevertheless certain other types of crops have traditionally called for a great deal of human labor in their handling. Thus, many types of leaf vegetables such as spinach, lettuce, celery, and turnip greens, for example, are ordinarily gathered by hand and placed in crates or baskets to be carried from the field. Such vegetables must then either be removed from their baskets in the packing shed and washed and placed in clean baskets or the baskets of vegetables as received from the field may be immersed in a tank. One device which has been employed for washing vegetables in their original containers comprises an endless belt which descends into a tank of water and carries the baskets out again at the other end of the tank. It has been found, however, that devices of this nature do not adequately wash the vegetables since a single submergence is seldom sufficient. Furthermore, no simple and inexpensive way of holding the baskets submerged upon the conveyor belt has been discovered.

Various vegetables other than root crops, for example celery, lettuce, and egg plant, may also desirably be washed or submerged in a water bath not so much for the purpose of cleaning the same as to cool them prior to shipping to market. Such vegetables may often be at a temperature of 80° F. or thereabouts when brought from the field, and such washing greatly freshens them and postpones the period when they will begin to wilt. There is also a considerable saving in ice or other coolant when such washed vegetables are then placed in refrigerated cars or trucks. By proper washing, the temperature of the vegetables may be reduced by as much as 15° F. or more.

Another advantage in properly washing garden vegetables is that insects, spray residues, and the like may be removed and the wash water may contain a small amount of a suitable preservative which will inhibit the development of rot, mold, fungus, and the like. Thus, the water bath may be salted in some instances, this being quite effective in eliminating insects from heads of cauliflower and the like, for example. A salt water wash is common procedure when the vegetables are to be shipped to canning companies. Certain vegetables such as egg plant and cucumbers are frequently washed in a dilute wax emulsion to coat the same with a thin film of wax, improving their appearance and keeping qualities.

The washing of vegetables in baskets by immersing such baskets in tanks of water by hand, although commonly employed, is a back-breaking operation which has proven highly unpopular and also results in destruction of many baskets which are unable to withstand the heavy load exerted on the handles when being lifted from the tank. Not only must the broken baskets be discarded but the vegetables therein must be transferred to a new basket, involving additional labor as well as material cost. This re-handling of relatively fragile vegetables such as celery and lettuce is particularly undesirable and is one of the important reasons for washing the same in their original containers.

It is therefore a primary object of my invention to provide a washing device particularly adapted to the washing, cooling and treating of fruits and vegetables in baskets or other similar containers.

Another object is to provide such device which will be largely automatic in action and thereby eliminate substantially all of the labor previously required for this operation.

Still another object is to provide such device which will be effective to submerge containers and contents normally tending to float and to raise the same above the liquid level to drain, all without subjecting such containers to any severe strains or stresses or otherwise damaging the same.

A further object is to provide such device whereby the containers may be repeatedly submerged and drained to obtain the desired washing effect without requiring any further handling between immersions.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 5 is an enlarged fragmentary elevational view of the upper portion of my machine taken along the line 5—5 on Fig. 1 and showing the driving mechanism;

Fig. 6 is a fragmentary detail view of a portion of such driving mechanism taken along the line 6—6 on Fig. 5;

Fig. 7 is a vertical sectional view similar to Fig. 2 but showing the positions of the parts shortly prior to submergence of the containers in the tank; and Fig. 8 is a view similar to Fig. 7 but showing the containers fully submerged.

Figure 1:
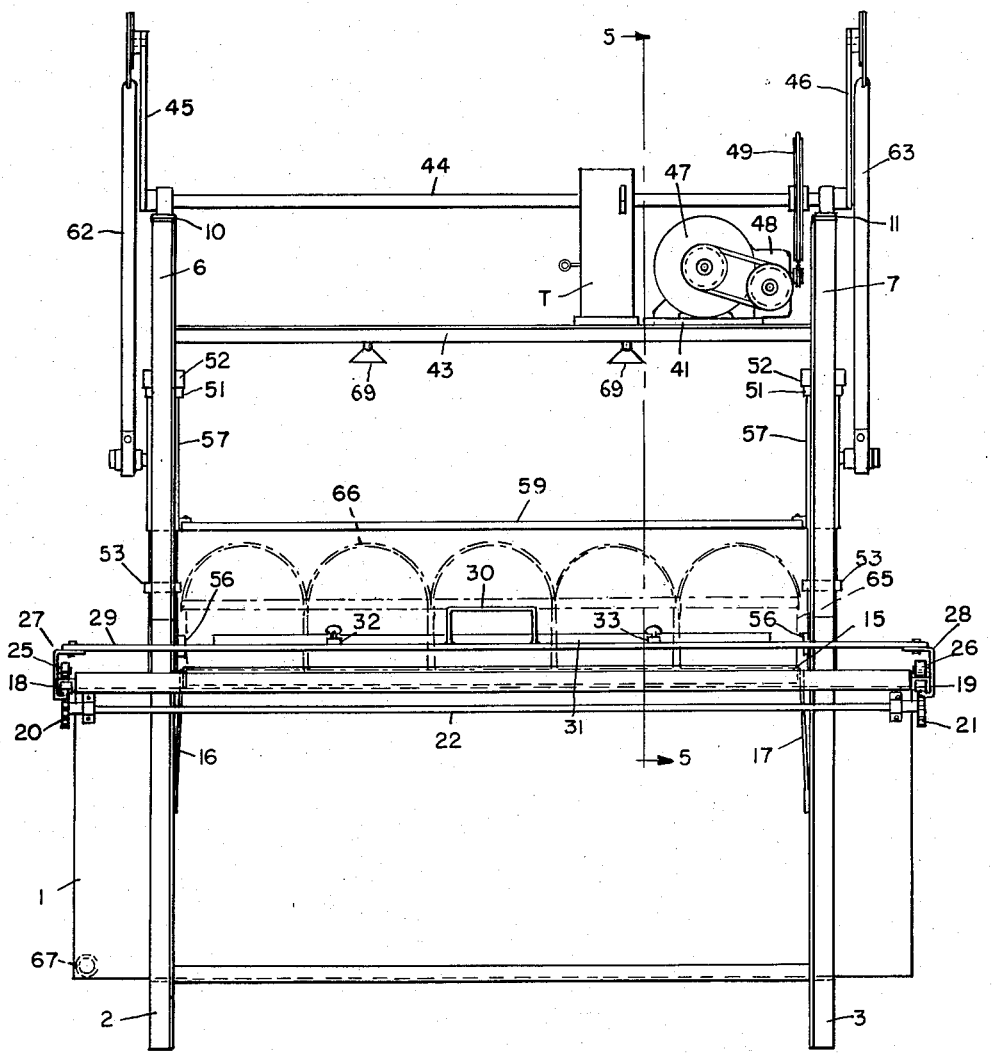
Fig. 1 is a front elevational view of a washing machine embodying the principles of my invention.

Referring now more particularly to such drawing and especially Figs. 1-4 thereof, the embodiment of my invention there illustrated comprises a large rectangular tank 1 carried by four upright angle iron leg and frame members 2, 3, 4 and 5. Upper extensions 6, 7, 8 and 9 respectively of such frame members are inclined inwardly over such tank and the pairs 6, 8 and 7, 9 respectively joined at their upper ends by cap plates 10 and 11. A pair of tubular columns 12 and 13 extend from the bottom 14 of tank 1 to which their lower ends are secured to such respective cap plates 10 and 11. These tubular columns not only serve as additional reinforcement but also act as guideways in a manner explained below.

A flat loading deck 15 supported by brackets 16 and 17 extends laterally even with the upper edge of tank 1. A pusher device is provided for the purpose of aligning baskets or the like on deck 15 and then pushing the baskets into position to be submerged in tank 1. Such device comprises spaced inverted channel-ways 18 and 19 secured as by welding to the respective sides of tank 1 and a pair of pinions 20 and 21 secured to the end of transverse shaft 22 and positioned directly beneath such respective channels. Racks 23 and 24 are fitted to slide within such respective channels with their teeth in engagement with such pinions 20 and 21. Rollers 25 and 26 are mounted in carriages 27 and 28 to roll along the upper surfaces of channels 18 and 19, such carriages being secured to the respective rack members 23 and 24 for reciprocation therewith (see Fig. 3). A connecting bar 29 interconnects the two carriages and is provided with an upwardly extending handle 30. The pusher proper comprises a cross-piece 31 mounted on connecting bar 29 by means of forwardly extending brackets 32 and 33. If desired, such brackets may be adjustably secured to connecting bar 29 to permit cross-piece 31 to be positioned at a selected distance therefrom. It will thus be seen that pusher 31 may be manually reciprocated by means of handle 30 and will always be maintained in proper alignment through the action of racks 23 and 24 and pinions 20 and 21. The inner ends of such respective racks 23 and 24 may also be provided with carriages 34 and 35 including rollers 36 and 37 adapted to ride along the upper surfaces of channels 18 and 19 to increase the ease with which pusher 31 may be reciprocated.

The opposite side of tank 1 has a trough or tray 38 secured thereto which is in communication with the interior of tank 1 so that any liquid may drain back into the latter. A plurality of rollers 39 are carried by inclined braces 40 within trough 38 to facilitate discharge of containers of washed vegetables or the like. Since such rollers are spaced above the bottom of trough 38, they likewise facilitate drainage of any liquid which may remain in such containers.

A shelf or platform 41 is supported by angle iron beams 42 and 43 extending between uprights 8 and 9 and 6 and 7 respectively. Journalled in bearings carried by cap plates 10 and 11 is a crankshaft 44 having identical cranks 45 and 46 secured to its respective ends. An electric motor 47 drives a speed reducer 48 which in turn drives sprocket 49 which is keyed to shaft 44. An automatic timer T of conventional type operated by a cam C on shaft 44 may be provided to regulate the number of revolutions which shaft 44 and its cranks will make before coming to a stop. Thus, the operator may set the timer for three immersion cycles and when cam C has made three complete revolutions the timer will automatically interrupt the circuit to motor 47. The chain and sprocket drive renders speed reducer 48 effective to stop the crankshaft promptly where desired (ordinarily with such cranks extending directly upwardly).

Referring now more especially to Figs. 5 and 6, tubular columns 12 and 13 serve as slideways for a portion of the mechanism whereby the containers of vegetables or the like may be submerged in tank 1. An inner tubular slide 50 is mounted for vertical reciprocation on each of such columns 12 and 13. Such slide is provided with a collar 51 at its upper end and a stop collar 52 is adjustably secured to the column thereabove. Another collar 53 is adjustably secured to the lower portion of slide 50 for a purpose to be explained below. An inverted channel member 54 bridges the lower ends of the respective slides 50 and carries a plurality of relatively narrow transversely disposed channels 55 forming a ribbed or slatted platform upon which the containers of vegetables are adapted to rest for submerging in the tank. Flat side guide members 56 are welded to inner slides 50 a short distance above platform supporting member 54 to assist in insuring proper alignment of the containers upon the platform and laterally to support such containers during the washing operation.

A second outer tubular sleeve 57 fits over each sleeve 50 for reciprocation therealong. The degree of such reciprocation relative to the inner sleeve is limited by upper collar 51 and lower collar 53. A presser member extends between the lower ends of the respective sleeves 57 and in the embodiment here illustrated comprises two parallel wooden boards 58 and 59 spaced to leave a gap therebetween to avoid engagement with the handles of half bushel baskets or similar containers resting upon ribbed platform 55. A pair of tension springs 60 and 61 extend on either side of the columns from the upper end of outer sleeves 57 to the lower, platform supporting, ends of inner sleeves 50.

Connecting rods 62 and 63 pivotally connect the outer ends of cranks 45 and 46 respectively with the corresponding outer sleeves 57 for identical reciprocation of the latter as drive shaft 44 turns.

To facilitate loading of the containers upon the immersion platform the ends of ribs 55 extending toward deck 15 may be slightly downturned, and to facilitate discharge of the washed containers onto rollers 39 a roller 64 may be mounted on the adjacent side of such platform extending between the two end ribs 55.

The operation of the above-described apparatus is as follows. A plurality of baskets 65 (in this case for purposes of illustration five half bushel baskets are shown in dotted line) are placed upon deck 15 in close side-by-side relationship and pushed by means of pusher 31 onto the platform comprised of ribs 55 supported by the lower ends of inner sleeves 50. Cranks 45 and 46 will be extending directly upwardly at this stage of the proceedings so that the platform comprising ribs or slats 55 is rigidly supported on a level with deck 15. In other words, outer sleeves 57 will be in engagement with upper collars 51 on inner sleeves 50, stop collars 52 preventing such inner sleeves from rising higher under the influence of the tension springs. Pusher 31 is so adjusted that the baskets 65 are left on ribbed platform 55 with their handles 66 aligned beneath the gap extending between the two parallel boards 58 and 59 comprising the presser member carried by the lower ends of outer sleeves 57.

The timer will have been set for the desired number of cycles, three usually being found both desirable and sufficient. The operator now starts motor 47 revolving cranks 45 and 46 in the manner shown in Figs. 7 and 8. When the cranks have reached the position shown in Fig. 7, the outer sleeves 57 will have been moved downwardly away from collars 51 on the upper ends of inner sleeves 50 and such latter sleeves will have moved downwardly along columns 12 and 13 only slightly at this stage, being supported by the tension springs 60, 61. When presser members 58 and 59 engage baskets 65 (or very slightly prior thereto) the lower ends of outer sleeves 57 engage stop collars 53 on inner sleeves 50, thereby now positively moving such inner sleeves and the ribbed platform carried thereby downwardly simultaneously with the presser members.

As the cranks continue to turn to their lowermost position as shown in Fig. 8, the baskets are now entirely submerged below the liquid level, being unable to float because of the presser members bearing thereon. As the cranks now continue to rotate, outer sleeve 57 is moved upwardly and the basket-carrying platform supported by the inner sleeves follows through the action of the tension springs. When the baskets of vegetables begin to emerge from the liquid within the tank, however, the weight of the baskets and containers will cause the latter to lag, springs 60 and 61 being further extended until outer sleeves 57 have moved upwardly into engagement with collars 51. At this point presser members 58 and 59 have, of course, been carried clear of the basket handles 66. When outer sleeves 57 engage collars 51 on inner sleeves 50, they now positively lift such inner sleeves and the platform and baskets carried by the latter bringing the same back up to original starting position (as nearly reached in Fig. 2). Since the timer has been set for three complete cycles, the operation will now repeat two more times and finally stop with the baskets again on a level with deck 15. It has been found that such three-cycle operation will ordinarily remove substantially all of the dirt due to the repeated "sloshing" effect obtained and also the cooling is very efficient due to the three changes of water in the baskets.

In a slightly different embodiment of my invention the springs employed may be incapable of supporting the loaded immersion platform as it descends toward the bath, so that collars 51 rest on the upper ends of sleeves 57 until the platform enters the bath. The buoyant effect of the water now supplements the spring action so that presser boards 58 and 59 are brought down into operative relationship, engaging stop 53, and the platform and load thereon are positively immersed. It is apparent that if a sufficiently buoyant platform be employed the springs may be discarded entirely. Or compression springs may be substituted beneath the platform to achieve the desired "buoyancy," although such an arrangement will not permit of as much variation in size of the containers handled as does my preferred embodiment. Furthermore, stops 53 are not always essential since in some instances the containers will be sufficiently strong and rigid to withstand the full pressure required for immersion imposed by members 58 and 59. The springs have a beneficial effect in reducing jerking and jarring of the mechanism, however.

During the foregoing washing operation the operator will have placed five more baskets of vegetables or the like upon deck 15 so that when the operation has been completed pusher 31 may be caused to deliver the new baskets to slatted platform 55, thereby ejecting the washed baskets onto the discharge rollers 39. The usual speed of operation is such that a single operator can both load deck 15 with a new set of containers and remove all of the washed ones from trough 38 without any intermission in the operation of the machine except for the brief interval required to push the new set of baskets into place on the washing platform.

Figure 2:
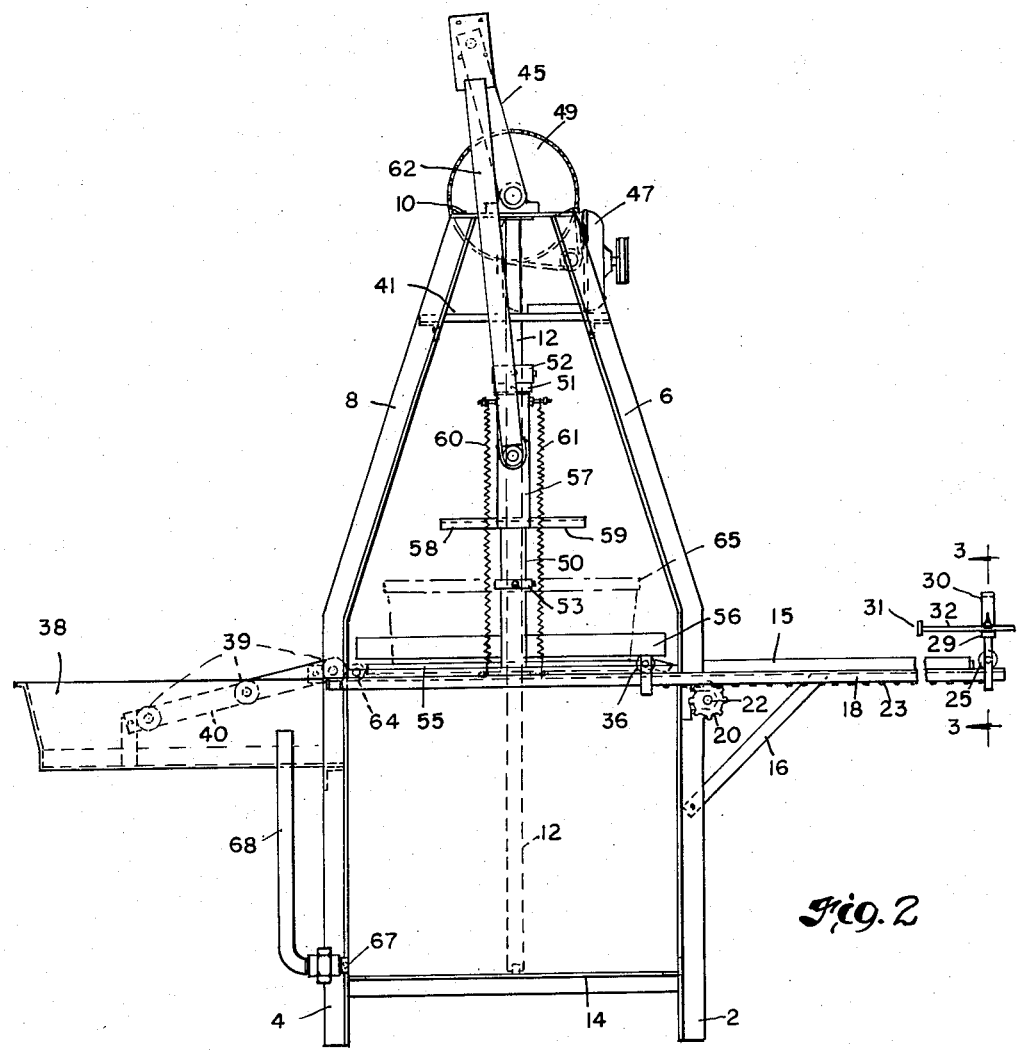
Fig. 2 is a side elevational view of the machine of Fig. 1.
Figure 3:
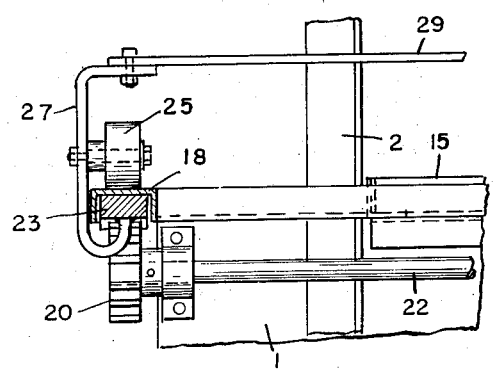
Fig. 3 is a fragmentary detail view of the work loading means taken along the line 3—3 on Fig. 2.
Figure 4:
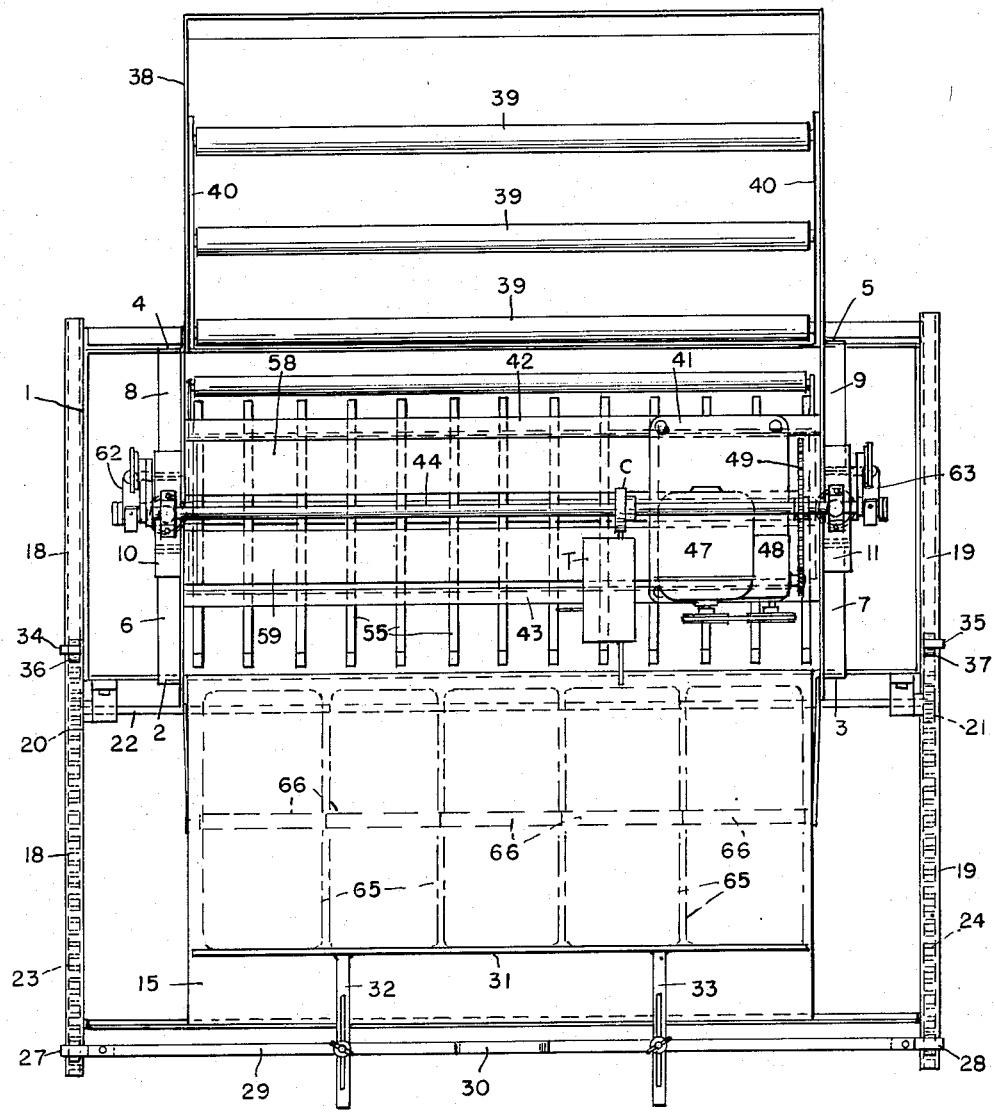
Fig. 4 is a top plan view of my new machine.

A drain plug 67 is provided at the bottom of tank 1 by which means the tank may be emptied. If desired, a constant flow of water through the tank may also be maintained. In the latter case, as shown in Fig. 2, an overflow pipe 68 may be provided, its upper end extending slightly above the bottom level of trough 38. This arrangement is effective in drawing off the muddiest water as fresh water is added in the form of an overhead spray from spray nozzles 69 (Figs. 1, 7 and 8) upon the baskets as they are pushed onto discharge rollers 39. Since the end portions of the tank extend beyond the ends of the immersion platform, these sections may be screened off and cracked ice placed therein to enhance the cooling effect of the bath. The water level is ordinarily kept slightly above the bottom of trough 38 (Fig. 7) but of course rises to about the level of lowermost roller 39 when the baskets are submerged (Fig. 8). These three rollers 39 in effect form a drainage rack inclined downwardly away from the tank both to facilitate drainage and to present handles 66 in convenient position to be grasped by the operator. Not only does the washing operation clean and cool the vegetables but it also tends to reduce the degree to which the same may become dehydrated when now placed in refrigerator cars. A waterproof edible grease may desirably be employed to lubricate the slides and other moving parts.

My new machine will accommodate a wide variety of baskets, crates, or other containers with a minimum of adjustment. Pusher 31 and stops 52 are ordinarily the only parts that may require resetting. If intended to handle only crates (having no upstanding handles) the presser member may comprise a single grid or screen supported by a suitable frame to facilitate entry of the water. No excessive strain is imposed on the containers so that breakage is minimized, and the operator is not required to immerse his arms in cold water as was the case formerly. Labor costs are reduced and the vegetables such as watercress are not damaged by crushing as was frequently the case when the operator was forced to press down upon the contents of the basket with his hands in order to submerge the same.

Other modes of applying the principle of the invention may be employed, change being made as regards the details described, provided the features stated in any of the following claims or the equivalent of such be employed.

I therefore particularly point out and distinctly claim as my invention:

1. A machine for washing vegetables in baskets or like containers comprising a rectangular tank, a loading deck extending at a level even with the top of said tank at one side thereof, a trough on the other side of said tank in communication therewith and provided with a plurality of rollers therein extending parallel to the adjacent side of said tank, said rollers being arranged in spaced descending series away from said tank to receive such containers after the washing operation, a pair of vertically disposed spaced columns respectively positioned adjacent opposite ends of said tank therewithin, sleeves on said columns reciprocable therealong, a work supporting platform carried between the lower ends of said sleeves, said platform comprising a transverse member extending between said sleeves and a plurality of horizontally disposed ribs mounted on said member transversely thereof, the end portions of said ribs toward said loading deck being slightly downturned, a roller supported between the end ribs on the side toward said trough to facilitate discharge of such containers onto the rollers in such trough, a pusher bar extending across said deck and mounted for reciprocation laterally toward and away from said tank, such mounting for said pusher bar being adjustable initially to position the latter a selected distance from said tank with regard to the size of the containers to be accommodated, side guides on said sleeves above said platform to assist in positioning and laterally supporting containers moved onto said platform by actuation of said pusher bar, outer sleeves on said first sleeves and reciprocable relative thereto, a drive shaft rotatably mounted on the upper ends of said columns and extending therebetween, an electric motor and speed reducer arranged to turn said shaft, a timer operative to regulate the number of revolutions of said shaft before stopping the same, identical cranks on the respective ends of said shaft pivotally connected to said respective outer sleeves, stops on the upper ends of said inner sleeves whereby said inner sleeves will be raised together with said outer sleeves when engaged by the latter, in their highest position bringing said platform level with said deck, adjustable stops on said columns above said sleeves limiting upward movement of said inner sleeves, tension springs extending from said outer sleeves to the lower end portions of said respective inner sleeves and tending to elevate said inner sleeves and platform relative to said outer sleeves, adjustable stops on said inner sleeves adapted to limit downward reciprocation of said outer sleeves relative to said inner sleeves, work presser means comprising two parallel horizontally spaced members extending between said respective outer sleeves above said platform, liquid spray means supported above said tank and trough in position to spray downwardly upon containers in course of being transferred from said platform to said trough rollers, and an overflow pipe leading from said tank adjacent the bottom thereof and extending upwardly outside said tank to a level slightly above the bottom of said trough.

2. A machine for washing vegetables in containers such as baskets or the like comprising a tank, a loading deck to one side of said tank, a trough on the other side of said tank in communication therewith, a rack in said trough inclined downwardly away from said tank, a pair of vertically disposed columns respectively positioned adjacent opposite ends of said tank therewithin and extending from the bottom of said tank to a level substantially above the top of said tank, sleeves on said columns reciprocable therealong, a work supporting platform carried between the lower ends of said sleeves, said platform comprising a transverse member extending between said sleeves and a plurality of horizontally disposed ribs mounted on said member transversely thereof, a pusher bar extending across said deck and mounted for reciprocation laterally toward and away from said tank, such mounting for said pusher bar being adjustable initially to position the latter a selected distance from said tank with regard to the size of the containers to be accommodated, outer sleeves on said first sleeves and reciprocable relative thereto, a drive shaft extending between the upper portions of said columns, an electric motor and speed reducer arranged and adapted slowly to turn said shaft, a timer operative to regulate the number of complete revolutions made by said shaft before stopping the same, identical cranks on the respective ends of said shaft pivotally connected to said respective outer sleeves and extending vertically upwardly in starting position, stops on the upper ends of said inner sleeves adapted to engage said outer sleeves whereby said inner sleeves may be raised by upward reciprocation of said outer sleeves, in their highest position bringing said platform level with said deck, stops on said columns above said sleeves limiting upward movement of said inner sleeves, tension springs extending from said outer sleeves to the lower end portions of said respective inner sleeves and tending to elevate said inner sleeves and platform relative to said outer sleeves, adjustable stops on said inner sleeves adapted to limit downward reciprocation of said outer sleeves relative to said inner sleeves, and work presser means comprising two parallel horizontally spaced members extending between said respective outer sleeves above said platform.

3. A machine for washing vegetables in containers such as baskets and the like comprising a tank, a pair of vertically disposed columns respectively positioned adjacent opposite ends of said tank therewithin and extending from the bottom of said tank to a level substantially above the top of said tank, slides on said columns reciprocable therealong, a work supporting platform carried between the lower ends of said slides, said platform being of slotted construction to facilitate submergence and draining, a second slide mounted on each of said respective first slides for vertical reciprocation relative thereto, a drive shaft extending between the upper portions of said columns, a motor operative to turn said shaft, a timer operative to regulate the number of complete revolutions made by said shaft before stopping the same, identical cranks on the respective ends of said shaft pivotally connected to said respective second slides and extending vertically upwardly when in starting position, stops on the upper ends of said first slides adapted to engage said second slides whereby said first slides may be raised by upward reciprocation of said second slides, stops on said columns above said slides limiting upward movement of said first slides, tension springs extending from said second slides to the lower end portions of said respective first slides and tending to elevate said first slides and platform relative to said second slides, adjustable stops on said first slides adapted to limit downward movement of said second slides relative to said first slides, and work presser means comprising two parallel horizontally spaced members extending between said two second slides above said platform.

4. A machine for washing vegetables in containers such as baskets and the like comprising a tank, a pair of vertically disposed guideways within said tank adjacent opposite ends thereof, slides on said guideways reciprocable therealong, a work supporting platform carried between said slides, a second slide mounted on each of said respective first slides for vertical reciprocation relative thereto, a drive shaft extending between said guideways, means operative to turn said shaft, identical cranks on the respective end portions of said shaft pivotally connected to said respective second slides and extending vertically upward when in starting position, stops on said first slides adapted to engage said second slides as the latter move upwardly whereby said first slides will likewise be raised, resilient means adapted to act on said first slides tending to raise the same relative to said second slides, stops on said first slides adapted to limit downward movement of said second slides relative to said first slides, and work presser means comprising two horizontally spaced members extending between said two second slides above said platform.

5. A machine for washing articles in containers such as baskets having upstanding handles comprising a tank adapted to contain a bath of wash water, a work supporting platform mounted for vertical reciprocation down into said tank below the level of such bath and upwardly above such level, presser means extending above said platform and also mounted for vertical reciprocation, means operative positively to reciprocate said presser means, said presser means comprising two horizontally spaced members adapted to engage such containers with such handles extending upwardly therebetween, means interengaging said presser means and said platform when said presser means is raised to pick up said platform and also raise the latter, means interengaging said presser means and said platform positively to depress the latter when said presser means has been lowered a predetermined distance relative thereto, and means adapted to buoy said platform in such bath to permit the same thus to be overtaken by said presser means, whereby said presser means may automatically be raised clear of such handles when said platform is raised and brought down closely on such baskets when said platform is lowered.

6. A washing machine comprising a tank adapted to contain a liquid bath, a work-supporting platform mounted for vertical reciprocation within said tank and adapted to descend below and rise above the liquid level therein, means operative to buoy up said platform to arrest its descent when lowered into such bath within said tank, presser means mounted for vertical reciprocation with and relative to said platform, and means operative automatically to lower said presser means to overtake said platform in thus arrested position at which point said presser means forces said platform to descend in such bath, thereby to hold such work in position thereon, and to raise said presser means relative to said platform when the latter is caused to rise from such bath.

7. A machine for washing buoyant work in open containers such as baskets and the like, comprising a tank adapted to contain a liquid bath, a platform adapted to support such containers mounted for vertical reciprocation within said tank, said platform being sufficiently buoyant to hold the loaded containers thereon at a level such that the same are not completely immersed in such liquid bath, and presser means adapted to overlie said containers to hold the buoyant work therein operative positively to depress said platform to submerge such containers completely after being positioned in overlying relation thereto.

8. A washing machine comprising a tank, a vertically reciprocable work supporting platform within said tank adapted to be held in work loading position in the upper portion of such tank, presser means mounted above said platform, drive means operative to move said presser means downwardly relative to said platform, means responsive to initial downward movement of said presser means operative to release said platform from such work loading position whereby the platform will descend in the tank under the weight of the work thereon, and means operative to check the descent of the thus released platform whereby said presser means will overtake said platform.

9. A washing machine comprising a tank, a work-supporting platform vertically reciprocable within said tank, a vertical reciprocable presser member above said platform from which the latter is supported and suspended for vertical movement relative thereto, and means operative positively to reciprocate said presser member, said platform tending to float when lowered into a bath within said tank, whereby said presser member will overtake and submerge said platform when moved downwardly and positively lift the same when moved upwardly a predetermined distance thereabove.

10. A washing machine particularly adapted for the washing of buoyant articles comprising a tank, a work-supporting platform vertically reciprocable within said tank, and a vertically reciprocable presser member above said platform from which the latter is supported and suspended for limited upward and downward movement relative thereto, said platform being buoyant when immersed in a washing bath within said tank.

11. A machine for washing articles in containers such as half-bushel baskets and the like comprising a loading deck, a tank adjacent thereto, a work-supporting platform mounted for vertical reciprocation within said tank and adapted in one position to rest on a level with said deck, presser means mounted above said platform and vertically reciprocable relative thereto, said presser means comprising two horizontally spaced members adapted to bear upon such containers with the handles thereof extending upwardly therebetween, a relatively shallow trough on the side of said tank opposite to said deck and in communication with said tank, a plurality of rollers in said trough parallel to the adjacent side of said tank and forming a rack sloping downwardly away from said tank, and pusher means overlying said loading deck adapted to engage a row of baskets on the latter to push such baskets simultaneously onto said platform, thereby to cause such row of baskets to engage and discharge a similar row of washed baskets from said platform onto said rollers.

12. A machine for washing articles in baskets and the like unable to withstand severe stresses thereon comprising a tank adapted to contain a wash bath, a work-supporting platform mounted for vertical reciprocation down into such bath and up out of such bath, presser means above said platform also mounted for vertical reciprocation, drive means operative positively to reciprocate said presser means, means interengaging said presser means and said platform when said presser means is raised to pick up said platform and positively raise the latter, means interengaging said presser means and said platform when said presser means has been lowered a predetermined distance relative thereto positively to depress said platform while closely overlying such basket but without exerting excessive pressure on the latter, and means adapted to buoy said platform in such bath to permit the same thus to be overtaken and depressed by said presser means.

ALFRED F. FOOTE.

References Cited in the file of this patent

UNITED STATES PATENTS

| Number | Name | Date |
|---|---|---|
| 1,216,496 | Rice | Feb. 20, 1917 |
| 1,249,286 | Stone | Dec. 4, 1917 |
| 1,421,055 | Adams | June 27, 1922 |
| 1,749,219 | Lindstrom | Mar. 4, 1930 |
| 1,809,736 | Speidel | June 9, 1931 |
| 1,900,927 | Gettins | Mar. 14, 1933 |
| 1,960,104 | Gay | May 22, 1934 |
| 1,960,339 | Howard | May 29, 1934 |
| 2,068,408 | Greulach | Jan. 19, 1937 |
| 2,374,535 | Gibson | Apr. 24, 1945 |